(12) United States Patent
Hase et al.

(10) Patent No.: US 8,430,789 B2
(45) Date of Patent: Apr. 30, 2013

(54) VEHICLE CONTROL DEVICE

(75) Inventors: Shigekazu Hase, Nishio (JP); Hiroya Ueno, Wolfsburg (DE); Kohei Tsuda, Aujyo (JP); Eiji Moriyama, Okasaki (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 629 days.

(21) Appl. No.: 12/591,891

(22) Filed: Dec. 3, 2009

(65) Prior Publication Data

US 2010/0173745 A1      Jul. 8, 2010

(30) Foreign Application Priority Data

Jan. 8, 2009   (JP) ................................. 2009-002489

(51) Int. Cl.
| | |
|---|---|
| *B60W 10/02* | (2006.01) |
| *B60W 10/08* | (2006.01) |
| *B60W 10/04* | (2006.01) |
| *H02P 17/00* | (2006.01) |
| *B60K 1/00* | (2006.01) |

(52) U.S. Cl.
    USPC ................ 477/5; 477/6; 477/8; 477/4; 477/9; 477/15; 180/65.7

(58) Field of Classification Search .................. 477/4–9, 477/15; 903/945, 946; 475/1–10; 180/65.6, 180/65.7
See application file for complete search history.

(56) References Cited

U.S. PATENT DOCUMENTS 6,128,565 A    10/2000  Tsutsui et al.
7,100,720 B2 *  9/2006  Ishikawa .................... 180/65.26

FOREIGN PATENT DOCUMENTS

| JP | A 06-331013 | 11/1994 |
|---|---|---|
| JP | A-11-082712 | 3/1999 |
| JP | 2000152407 A | * 5/2000 |
| JP | A 2004-203219 | 7/2004 |
| JP | 2007191018 A | * 8/2007 |
| JP | A 2008-094332 | 4/2008 |

OTHER PUBLICATIONS

Machine translation of JP2007191018A, Aug. 25, 2012.*
Machine translation of JP2000152407A, Aug. 25, 2012.*
International Search Report mailed Mar. 16, 2010 for PCT/JP2009/070596.
Partial Translation of Dec. 18, 2012 Office Action issued in Korean Patent Application No. 10-2011-7006682.

* cited by examiner

*Primary Examiner* — Tisha Lewis
(74) *Attorney, Agent, or Firm* — Oliff & Berridge, PLC

(57) ABSTRACT

A vehicle control device that includes an input member drive-coupled to an engine and a rotary electrical machine; an output member; and a transmission having a plurality of friction engagement elements, in which a plurality of shift speeds are switched by controlling engagement and release of the plurality of friction engagement elements, and a rotary driving force of the input member is shifted by a change gear ratio of one of the shift speeds and outputted to the output member.

19 Claims, 9 Drawing Sheets

F I G . 3
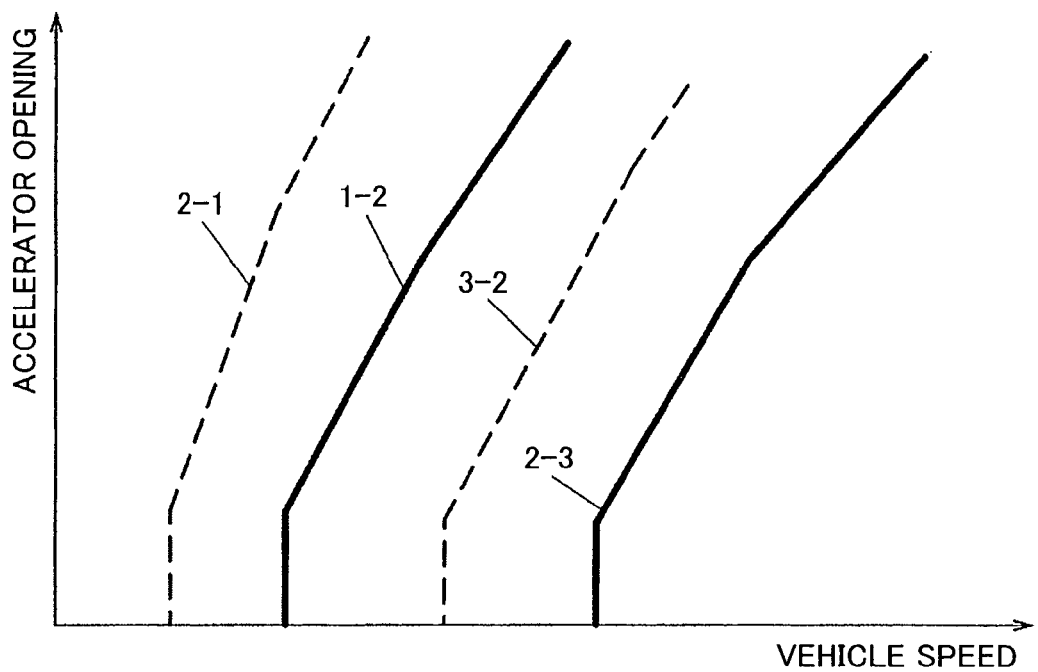
F I G . 4
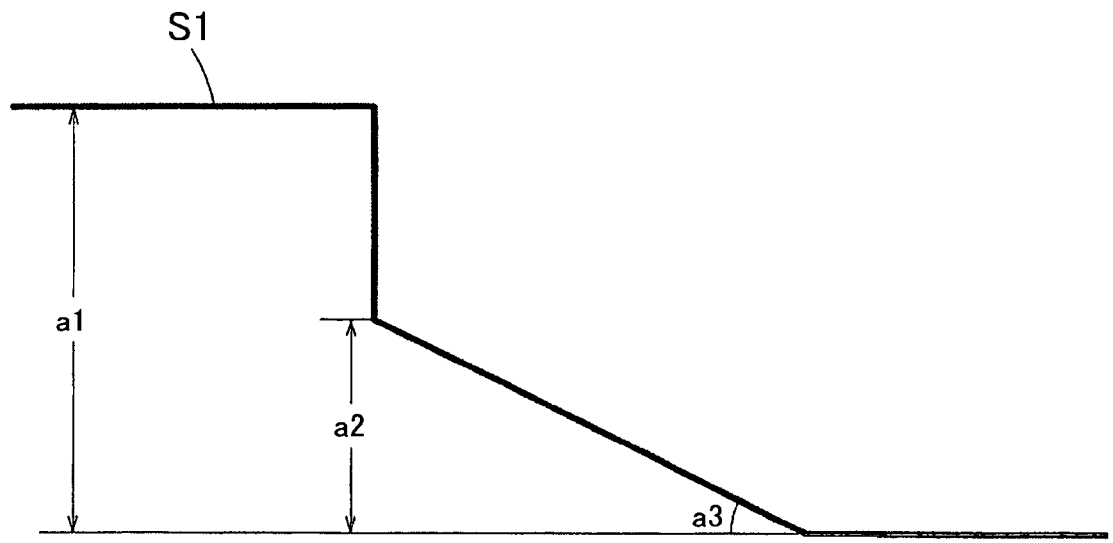

VEHICLE CONTROL DEVICE

INCORPORATION BY REFERENCE

The disclosure of Japanese Patent Application No. 2009-002489 filed on Jan. 8, 2009 including the specification, drawings and abstract is incorporated herein by reference in its entirety.

BACKGROUND

The present invention relates to a vehicle control device for controlling a vehicle drive apparatus including an input member drive-coupled to an engine and a rotary electrical machine, an output member, and a transmission having a plurality of friction engagement elements, in which a plurality of shift speeds are switched by controlling engagement and release of the plurality of friction engagement elements, and a rotary driving force of the input member is shifted by a change gear ratio of one of the shift speeds and outputted to the output member.

In recent years, hybrid vehicles have been brought into practical use in which fuel efficiency of engine can be improved and exhaust gas can be reduced by using an engine and a rotary electrical machine in combination as driving force sources. As an example of a vehicle drive apparatus used in such a hybrid vehicle, Japanese Patent Application Publication No. JP-A-2008-094332 listed below describes a vehicle drive apparatus structured to shift the rotary driving force of the engine and the rotary electrical machine as driving force sources by the change gear ratio of one of shift speeds set in a transmission and output the shifted driving force.

In such a drive apparatus for hybrid vehicle, when the vehicle turns to a coast state by removing a foot from the accelerator pedal, switching to a shift speed with a smaller change gear ratio (upshift) may be performed depending on the relation to the vehicle speed, and so on. Here, when the shift speed is switched between two adjacent shift speeds, engagement and release of friction engagement elements are controlled to perform what is called a changeover shift. In this changeover shift, normally, the friction engagement element on the release side is fully released relatively quickly in an initial stage of the shift operation, and the friction engagement element on the engagement side is engaged gradually while slipping. Negative torque acting on the input member is small in an ordinary vehicle which has only the engine as the driving force source, and even in a hybrid vehicle when the rotary electrical machine is not performing regeneration, or the like. When such shift control is performed, the rotation speed of the input member merely decreases by friction forces of respective parts in the engine and the like, and changes gently. Therefore, there hardly occurs a problem of generation of shock (shift shock) when the friction engagement element on the engagement side is engaged.

When the vehicle is in the coast state, braking may be performed subsequently by the intention of the vehicle driver. In this situation, in the drive apparatus for hybrid vehicle as described above, braking of the vehicle may be performed by causing the rotary electrical machine to perform regeneration. In the case where the rotary electrical machine performs regeneration, the rotary electrical machine outputs and transmits relatively large negative torque to the input member. Thus, when the usual changeover shift as described above is performed, the rotation speed of the input member is decreased largely by the negative torque outputted by the rotary electrical machine and changes rapidly, and it is highly possible to generate shift shock. Accordingly, the vehicle drive apparatus described in Japanese Patent Application Publication No. JP-A-2008-094332 is structured to limit the magnitude of the negative torque (regeneration torque) outputted by the rotary electrical machine to a certain magnitude or smaller when performing regeneration. Thus, generation of shift shock in the vehicle due to a rapid drop of the rotation speed of the input member drive-coupled to the rotary electrical machine is suppressed.

SUMMARY

However, when the magnitude of regeneration torque is limited as described above, it is possible to suppress generation of shift shock, but the regenerated energy decreases by that amount, thereby causing a problem of decrease in energy efficiency.

The present invention is made in view of the above problem, and it is an object of the present invention is to provide a technique capable of achieving both suppression of generation of shock (shift shock) in a vehicle by a shift operation and improvement in energy efficiency, when performing switching to a shift speed having a smaller change gear ratio during regeneration.

To achieve this object, a vehicle control device according to a first aspect of the present invention for controlling a vehicle drive apparatus includes an input member drive-coupled to an engine and a rotary electrical machine, an output member, and a transmission having a plurality of friction engagement elements, in which a plurality of shift speeds are switched by controlling engagement and release of the plurality of friction engagement elements, and a rotary driving force of the input member is shifted by a change gear ratio of one of the shift speeds and outputted to the output member. In the vehicle control device, when switching to the shift speed having a smaller change gear ratio is performed in the transmission in a state that the rotary electrical machine is performing regeneration, a release side oil pressure as an oil pressure of operating oil for a release side element, which is the friction engagement element on a release side, is controlled so as to maintain the release side element in a slip state across an entire shift process.

Here, the shift process represents a process that a rotation speed of the input member shifts from a rotation speed before switching shift speeds to a rotation speed after switching shift speeds, which is determined based on change gear ratios of shift speeds before and after switching. Further, in the present application, the "rotary electrical machine" is used as a concept including all of a motor (electric motor), a generator (power generator), and a motor-generator which functions as both the motor and the generator if required.

In the above-described characteristic structure, by controlling the release side oil pressure so that the release side element is maintained in a slip state across the entire shift process, there is maintained a state that part of the rotary driving force from the output member is transmitted to the input member side via the release side element across the entire shift process. Accordingly, even when the rotary electrical machine is made to output relatively large negative torque for performing regeneration, the rotary driving force transmitted from the output member suppresses a rapid change of the rotation speed of the input member. Thus, generation of shift shock can be suppressed. Further, since the generation of shift shock can be suppressed just by controlling the release side oil pressure, it is not necessary to limit the magnitude of the negative torque (regeneration torque) outputted by the rotary electrical machine, which is different from the case where the release side element is fully released relatively quickly in an initial stage of the shift process. Therefore, a problem such as decrease in regenerated energy does not occur, and high energy efficiency can be maintained. Therefore, with this structure, it is possible to achieve both suppression of generation of shift shock and improvement in energy efficiency, when performing switching to a shift speed having a smaller change gear ratio during regeneration.

Here, change rate control may be performed to decrease the release side oil pressure by a pressure reduction rate corresponding to a magnitude of regeneration torque outputted by the rotary electrical machine.

With this structure, by performing relatively simple control to gradually decrease the release side oil pressure so as to gradually increase the ratio of slipping of the release side element, a rapid change of the rotation speed of the input member can be suppressed. At this time, the magnitude of a rotary driving force transmitted from the output member which is required for gently changing the rotation speed of the input member differs depending on the magnitude of the regeneration torque outputted by the rotary electrical machine. Accordingly, the pressure reduction rate for decreasing the release side oil pressure is changed according to the magnitude of the regeneration torque outputted by the rotary electrical machine, and thereby the rotation speed of the input member is changed appropriately. Thus, generation of shift shock can be suppressed.

Further, rotation speed control may be performed to change the release side oil pressure so that a rotation speed of the input member becomes a target rotation speed at every time point of the shift process.

With this structure, the target rotation speed at every time point is set appropriately and the release side oil pressure is changed sequentially according to the target rotation speed, and thereby the rotation speed of the input member at every time point is precisely controlled and meanwhile changed appropriately. Thus, generation of shift shock can be suppressed.

Further, in an initial stage of the shift process, change rate control may be performed to decrease the release side oil pressure by a pressure reduction rate corresponding to a magnitude of regeneration torque outputted by the rotary electrical machine, and at a predetermined switch point or later after the change rate control is performed, rotation speed control may be performed to change the release side oil pressure so that a rotation speed of the input member becomes a target rotation speed at every time point after the change rate control.

With this structure, in the initial stage of the shift process, by performing relatively simple control to gradually decrease the release side oil pressure so as to gradually increase the ratio of the release side element to slip, a rapid change of the rotation speed of the input member can be suppressed. Further, in a later stage of the shift process at the predetermined switch point or later, the release side oil pressure is changed sequentially according to the target rotation speed, and the rotation speed of the input member at every time point is precisely controlled and changed appropriately, whereby a rapid change of the rotation speed of the input member can be suppressed. Therefore, by relatively simple control in its entirety, generation of shift shock can be suppressed. In addition, in another preferred structure, the predetermined switch point in this case is set based on the rotation speed of the input member, time from the start of the change rate control, a level of the release side oil pressure, and/or the like.

Further, in the rotation speed control, a target rotation speed at every time point of the shift process may be set to draw a trace over time which causes substantially no behavior change in the vehicle when switching of the shift speeds is performed.

With this structure, the target rotation speed at every time point of the shift process can be set appropriately, and generation of shift shock can be suppressed more reliably.

Further, in the rotation speed control, a target rotation speed change rate of the input member at every time point may be determined based on a target shift time set in advance representing a target time required for switching shift speeds and a rotation speed change width representing a difference in rotation speed of the input member before and after switching shift speeds, and control may be performed to change the release side oil pressure so that an actual rotation speed change rate of the input member follows a target rotation speed change rate at every time point.

Generally, shift shock occurs when the rotation speed of the input member changes rapidly. In other words, generation of shift shock is strongly related to a time change rate of the rotation speed of the input member. Accordingly, as in the above-described structure, a target value of the rotation speed change rate of the input member at every time point is set individually, and the release side oil pressure is changed so that the actual rotation speed change rate of the input member follows the target rotation speed change rate at every time point. In this manner, a rapid change of the rotation speed of the input member can be suppressed more securely, and generation of shift shock can be suppressed more reliably.

Further, in the change rate control, a lower limit value of the release side oil pressure may be set so that an engagement pressure of the release side element becomes equal to or higher than a certain pressure.

With this structure, in the case where the rotation speed control is performed after the change rate control is performed, the engagement pressure of the release side element can be changed in response to a change of the release side oil pressure quickly after the rotation speed control is started. Therefore, the rotation speed control can be performed appropriately. In addition, it is preferred that such a lower limit value of the release side oil pressure be set to a value such that the engagement pressure of the release side element has a value at least larger than zero.

Further, until the shift process is finished, an engagement side oil pressure as an oil pressure of operating oil for an engagement side element representing the friction engagement element on an engagement side may be maintained at a pressure which places the engagement side element in a released state across an entire range of the shift process, and after the shift process is finished, the release side oil pressure may be turned to zero, and the engagement side oil pressure be increased to a full engagement pressure.

In this structure, practically only the release side oil pressure is controlled so as to control the rotation speed of the input member for switching shift speeds. Therefore, with this structure, while generation of shift shock is suppressed by controlling the release side oil pressure as has been described, a changeover between the engagement side element and the release side element can be performed securely after the shift process is finished, so as to achieve the change gear ratio after shifting speed.

Further, the target rotation speed of the input member before and after switching the shift speeds based may be derived on a rotation speed and a change gear ratio of the output member, and the shift process may be a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

With this structure, a start point and an end point of the shift process can be determined appropriately based on the rotation speed of the output member, the change gear ratios of respective shift speeds before and after switching, and the actual rotation speed of the input member.

BRIEF DESCRIPTION OF THE DRAWINGS

FIG. 3 is a chart showing an example of a shift map according to this embodiment;

FIG. 4 is a schematic chart showing a release side control instruction signal according to this embodiment;

DETAILED DESCRIPTION OF EMBODIMENTS

Figure 1:
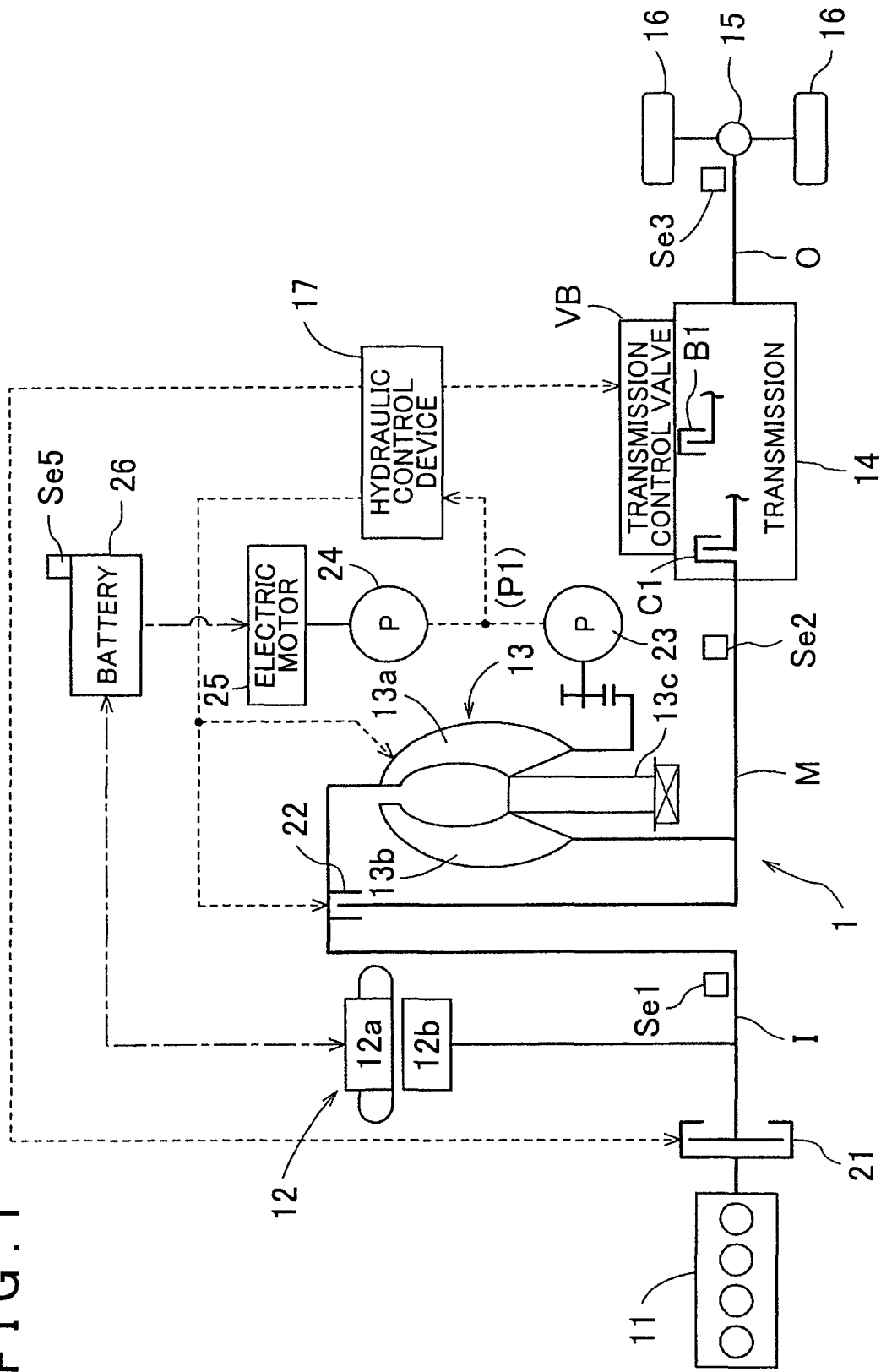
FIG. 1 is a schematic diagram showing a structure of a vehicle drive apparatus including a control unit according to an embodiment.
Figure 2:
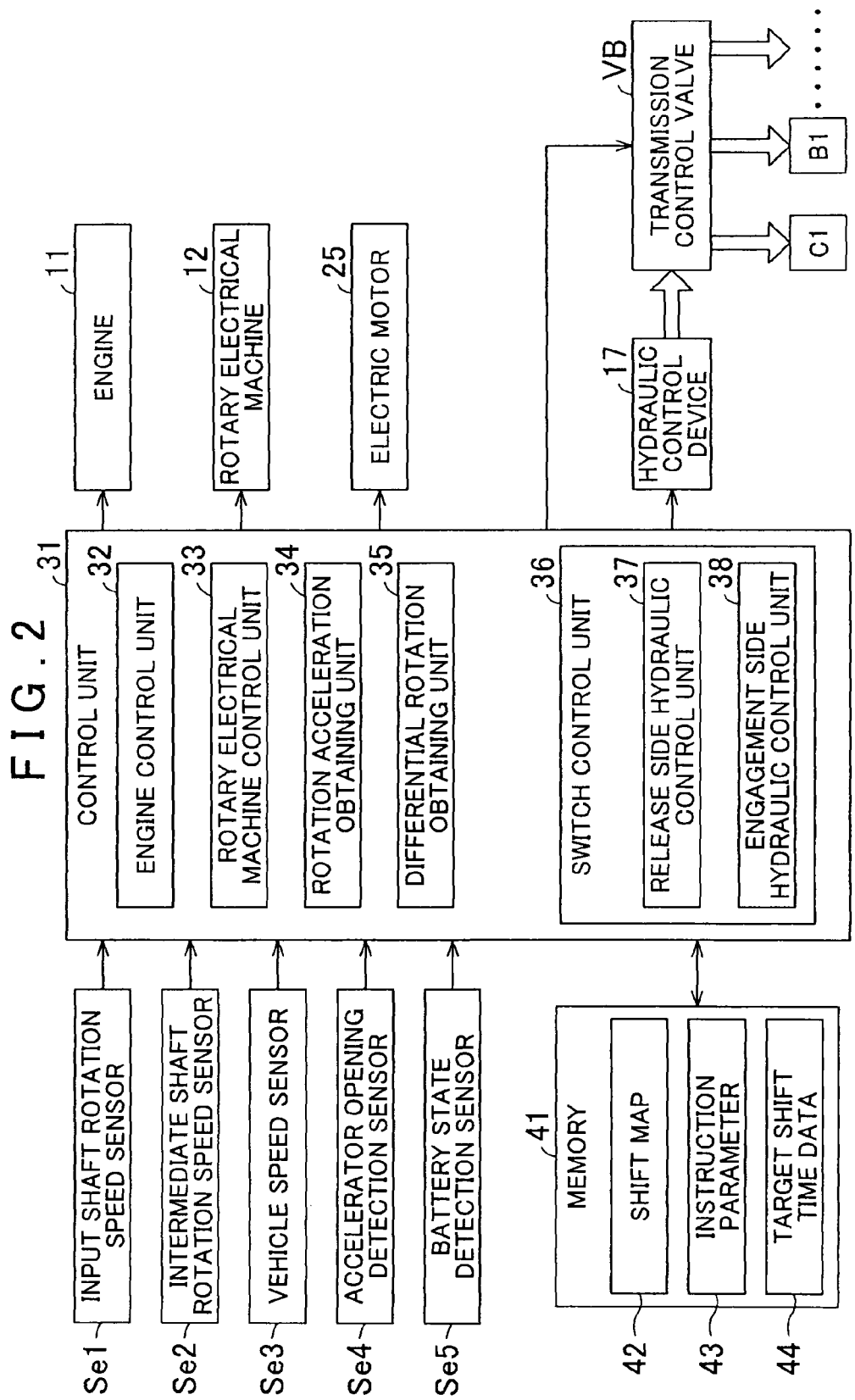
FIG. 2 is a block diagram showing a structure of the control unit according to this embodiment.

An embodiment of the present invention will be described with reference to the drawings. In this embodiment, an example of applying a vehicle control device according to the present invention to a vehicle drive apparatus 1 for hybrid vehicle will be described. FIG. 1 is a schematic diagram showing structures of a drive transmission system and a hydraulic control system of the vehicle drive apparatus 1 according to this embodiment. In this diagram, a solid line denotes a transmission path of a driving force, a dashed line denotes a supply path of operating oil, and a dot and dash line denotes a supply path of electric power. As shown in this diagram, the vehicle drive apparatus 1 according to this embodiment schematically includes an engine 11 and a rotary electrical machine 12 as driving force sources and is structured such that the driving force from these driving force sources is outputted via a torque converter 13 and a transmission 14 and transmitted to wheels 16. Further, this vehicle drive apparatus 1 includes a hydraulic control device 17 for supplying operating oil to parts such as the torque converter 13 and the transmission 14. FIG. 2 is a block diagram showing a structure of a control unit 31 according to this embodiment. In this diagram, a solid line denotes a transmission path of a signal, and an outline arrow denotes a supply path of operating oil. As shown in this diagram, the control unit 31 according to this embodiment is structured to control each part of the vehicle drive apparatus 1 including the hydraulic control device 17. In this embodiment, this control unit 31 corresponds to a "vehicle control device" according to the present invention.

1. The Structure of the Drive Transmission System of the Vehicle Drive Apparatus First, the structure of the drive transmission system of the vehicle drive apparatus 1 according to this embodiment will be described. As shown in FIG. 1, the vehicle drive apparatus 1 is a drive apparatus for a parallel-type hybrid vehicle having an engine 11 and a rotary electrical machine 12 as driving force sources for driving the vehicle, in which the engine 11 and the rotary electrical machine 12 are drive-coupled in series. Further, the vehicle drive apparatus 1 includes a torque converter 13 and a transmission 14, and shifts rotary driving forces of the engine 11 and the rotary electrical machine 12 as driving force sources with the torque converter 13 and the transmission 14, and transmits the shifted driving forces to an output shaft O.

The engine 11 is an internal combustion engine driven by combustion of fuel, and various types of publicly known engines, for example a gasoline engine and a diesel engine, can be used. In this example, an output rotation shaft of the engine 11 such as a crankshaft is drive-coupled to an input shaft I via a transmission clutch 21. Accordingly, the input shaft I is drive-coupled selectively to the engine 11 via the transmission clutch 21. This transmission clutch 21 receives supply of operating oil whose pressure is adjusted by the hydraulic control device 17, which will be described later, and operates while being controlled by a not-shown hydraulic control valve. In addition, in another preferred structure, the output rotation shaft of the engine 11 is drive-coupled integrally to the input shaft I or is drive-coupled thereto via another member such as a damper.

The rotary electrical machine 12 has a stator 12a fixed to a not-shown case, and a rotor 12b supported rotatably inside in a radial direction of this stator 12a. The rotor 12b of this rotary electrical machine 12 is drive-coupled to the input shaft I to rotate integrally therewith. That is, in this embodiment it is structured that both the engine 11 and the rotary electrical machine 12 are drive-coupled to the input shaft I. Therefore, in this embodiment, this input shaft I corresponds to an "input member" according to the present invention. The rotary electrical machine 12 is connected electrically to a battery 26 as a power storage device. The rotary electrical machine 12 is capable of performing a function as a motor (electric motor) generating motive power while receiving supply of power and a function as a generator (power generator) generating electric power while receiving supply of motive power. That is, the rotary electrical machine 12 is powered to rotate by receiving electric power supply from the battery 26, or stores in the battery 26 the electric power generated by rotary driving forces transmitted from the wheels 16. Note that the battery 26 is an example of the power storage device, and it is possible to use a different power storage device such as a capacitor, or use plural types of power storage devices in combination.

In this vehicle drive apparatus 1, rotary driving forces of both the engine 11 and the rotary electrical machine 12 are transmitted to the wheels 16 to enable the vehicle to travel. While traveling, depending on the state of charge of the battery 26, the rotary electrical machine 12 may be either in a state of generating a driving force by the electric power supplied from the battery 26, or in a state of generating electric power by the rotary driving force of the engine 11. Further, when the vehicle is decelerating, the transmission clutch 21 is released and the engine 11 is stopped, and the rotary electrical machine 12 turns to a state of generating electric power by the rotary driving forces transmitted from the wheels 16. The electric power generated by the rotary electrical machine 12 is stored in the battery 26. In a vehicle stop state, the transmission clutch 21 is released and the engine 11 and the rotary electrical machine 12 are stopped.

The torque converter 13 is drive-coupled to the input shaft I. The torque converter 13 is a device which transmits the rotary driving force of the input shaft I, which is drive-coupled to the engine 11 and the rotary electrical machine 12 as driving force sources, to the transmission 14 via an intermediate shaft M. The torque converter 13 includes a pump impeller 13a as an input side rotation member drive-coupled to the input shaft I, a turbine runner 13b as an output side rotation member drive-coupled to the intermediate shaft M, and a stator 13c provided therebetween and having a one-way clutch. Then the torque converter 13 transmits the driving force between the pump impeller 13a on the driving side and the turbine runner 13b on the driven side via the operating oil filled in the torque converter 13.

Here, the torque converter 13 includes a lock-up clutch 22 as a friction engagement element for locking up. This lock-up clutch 22 is a clutch for coupling the pump impeller 13a and the turbine runner 13b so that the pump impeller 13a and the turbine runner 13b rotate integrally, in order to increase transmission efficiency by eliminating a rotation difference (slip) between the pump impeller 13a and the turbine runner 13b. Therefore, in a state that the lock-up clutch 22 is engaged, the torque converter 13 directly transmits the driving force of the driving force source (input shaft I) to the transmission 14 (intermediate shaft M) without intervention of operating oil. In this embodiment, this lock-up clutch 22 is basically in an engaged state, and operates in a state that the input shaft I and the intermediate shaft M rotate integrally. However, when normal shift control, which will be described later, or the like is performed, such as when a downshift of the shift speed is performed, the lock-up clutch 22 is released so as to transmit the driving force via the torque converter 13 in order to suppress generation of shock (shift shock) in the vehicle by the shift operation. The torque converter 13 including the lock-up clutch 22 is supplied with operating oil whose pressure is adjusted by the hydraulic control device 17.

The transmission 14 is drive-coupled to the intermediate shaft M as the output shaft of the torque converter 13. The transmission 14 is a device which shifts the rotary driving force from the input shaft I transmitted via the torque converter 13 and transmits the shifted driving force to the output shaft O on the side of the wheels 16. Here, the transmission 14 is a multi-stage automatic transmission having plural shift speeds (multi-speed transmission). In this embodiment, the transmission 14 includes three shift speeds (first speed, second speed, and third speed) with different change gear ratios (speed reduction ratio) (not shown). To form these shift speeds, the transmission 14 is structured including a gear mechanism such as a planetary gear mechanism and a plurality of friction engagement elements. FIG. 1 schematically shows, as an example of the plurality of friction engagement elements, the clutch C1 and the brake B1. The three shift speeds are switched one another by controlling engagement and release of the plurality of friction engagement elements.

When switching the shift speed, one of the friction engagement elements engaged before shifting speed is released, and one of the friction engagement elements released before shifting speed is engaged. Accordingly, rotation states of a plurality of rotation elements included in the gear mechanism are switched, thereby realizing each shift speed. The transmission 14 shifts the rotation speed of the intermediate shaft M by a predetermined change gear ratio set for each shift speed, and converts torque and transmits the converted torque to the output shaft O as an output member. The rotary driving force transmitted from the transmission 14 to the output shaft O is then transmitted to the wheels 16 via a differential 15. Note that the structure in this example is a uniaxial structure in which all of the input shaft I, the intermediate shaft M, and the output shaft O are arranged coaxially.

2. The Structure of the Hydraulic Control System

Next, the hydraulic control system of the above-described vehicle drive apparatus 1 will be described. The hydraulic control system has two kinds of pumps, a mechanical pump 23 and an electric pump 24, as shown in FIG. 1, as oil pressure sources for sucking in operating oil stored in a not-shown oil pan and supplying the operating oil to respective parts of the vehicle drive apparatus 1. Here, the mechanical pump 23 is an oil pump operated by a rotary driving force of the input shaft I (the engine 11 and the rotary electrical machine 12 as driving force sources). As such a mechanical pump 23, for example, a gear pump, a vane pump, or the like is used preferably. In this example, the mechanical pump 23 is drive-coupled to the input shaft I via the pump impeller 13a of the torque converter 13, and is driven by the rotary driving force of one or both of the engine 11 and the rotary electrical machine 12. The mechanical pump 23 basically has a discharge ability sufficiently higher than the amount of operating oil needed for the vehicle drive apparatus 1. However, the mechanical pump 23 does not discharge the operating oil when the input shaft I is stopped (that is, when the vehicle is stopped). Further, the mechanical pump 23 discharges the operating oil while the input shaft I rotates at low speed (that is, when the vehicle is traveling at low speed), but there may be a situation that the pump is unable to supply a necessary amount of oil for the vehicle drive apparatus 1. Accordingly, this vehicle drive apparatus 1 includes the electric pump 24 as a pump for assisting the mechanical pump 23.

The electric pump 24 is an oil pump which operates by a driving force of an electric motor 25 for driving pump irrelevantly to the rotary driving force of the input shaft I (driving force source). As this electric pump 24 also, for example, a gear pump or a vane pump is used preferably. The electric motor 25 driving the electric pump 24 is connected electrically to the battery 26, and generates a driving force by receiving supply of electric power from the battery 26. This electric pump 24 is a pump for assisting the mechanical pump 23, and operates in a state that a necessary amount of oil is not supplied from the mechanical pump 23 when the vehicle is stopped or traveling at low speed.

Further, the hydraulic control system has the hydraulic control device 17 for adjusting the oil pressure of operating oil supplied from the mechanical pump 23 and the electric pump 24 to a predetermined pressure. Although a detailed description thereof is omitted here, the hydraulic control device 17 adjusts an opening of one or more regulating valves based on a signal pressure from a linear solenoid valve for adjusting oil pressure, so as to adjust the amount of operating oil drained from the regulating valve or valves, and thereby adjust the oil pressure of operating oil to one or more predetermined pressures. The operating oil adjusted to the predetermined pressure is supplied to the transmission clutch 21, the lock-up clutch 22, the torque converter 13, and the plurality of friction engagement elements C1, B1, . . . of the transmission 14, at oil pressure levels required respectively.

Here, the operating oil supplied from the hydraulic control device 17 to the plurality of friction engagement elements C1, B1, . . . of the transmission 14 is supplied individually via a transmission control valve VB, as shown in FIG. 2. At this time, the transmission control valve VB adjusts the opening of a valve according to a control instruction signal outputted from the control unit 31, and supplies to the friction engagement elements C1, B1, . . . the operating oil adjusted to the oil pressure corresponding to the control instruction signal. The present invention has characteristics in control of engagement and release of the plurality of friction engagement elements (control of the release side in particular) when switching of shift speeds is performed by the transmission 14. Details thereof will be described later.

3. The Structure of the Control Unit

Next, the structure of the control unit 31 according to this embodiment will be described. The control unit 31 included in the vehicle drive apparatus 1 performs a function as a core unit performing operation control of each part of the vehicle drive apparatus 1, as shown in FIG. 2. This control unit 31 has an arithmetic processing unit such as a CPU as a core unit, and is structured having storage devices such as a RAM (random access memory) structured such that data can be read therefrom and written thereto by the arithmetic processing unit, and a ROM (read only memory) structured such that data can be read by the arithmetic processing unit, and so on (not shown). Software (program) stored in the ROM or the like, or hardware provided separately such as an arithmetic circuit, or both form functional units 32 to 38 of the control unit 31. These functional units 32 to 38 are structured to be able to exchange information with each other. Further, a memory 41 is structured including, as a hardware structure, a storage medium, for example a flash memory, in which information can be stored or rewritten. The memory 41 is also structured such that information can be exchanged with the control unit 31. This memory 41 may be provided in the storage device included in the control unit 31.

Further, as shown in FIG. 1 and FIG. 2, this vehicle drive apparatus 1 includes a plurality of sensors provided in respective units, specifically, an input shaft rotation speed sensor Se1, an intermediate shaft rotation speed sensor Se2, a vehicle speed sensor Se3, an accelerator opening detection sensor Se4, and a battery state detection sensor Se5. Here, the input shaft rotation speed sensor Se1 detects the rotation speed of the input shaft I. The intermediate shaft rotation speed sensor Se2 detects the rotation speed of the intermediate shaft M. The vehicle speed sensor Se3 detects the rotation speed of the wheels 16, that is, the vehicle speed. The accelerator opening detection sensor Se4 detects the accelerator opening by detecting an operation amount of a not-shown accelerator pedal. The battery state detection sensor Se5 detects a battery state of the battery 26, such as a charge amount, a voltage value, and the like. Information indicating detection results by these sensors Se1 to Se5 is outputted to the control unit 31.

As shown in FIG. 2, the control unit 31 has an engine control unit 32, a rotary electrical machine control unit 33, a rotation acceleration obtaining unit 34, a differential rotation obtaining unit 35, and a switch control unit 36. Further, the switch control unit 36 has, as subordinate functional units, a release side hydraulic control unit 37 and an engagement side hydraulic control unit 38. The memory 41 to which the functional units 32 to 38 of the control unit 31 refer stores a shift map 42, an instruction parameter 43, and target shift time data 44. Details of the functional units 32 to 38 of the control unit 31 will be described below.

The engine control unit 32 is a functional unit performing operation control of the engine 11. The engine control unit 32 performs processing to determine an engine operation point and control the engine 11 to operate at this engine operation point. Here, the engine operation point is a control instruction value representing a control target point of the engine 11, and is determined by rotation speed and torque. More particularly, the engine operation point is an instruction value representing a control target point of the engine 11 determined in consideration of a required vehicle output (which is determined based on required vehicle torque and engine speed) and optimum fuel efficiency, and is determined by a rotation speed instruction value and a torque instruction value. The engine control unit 32 then controls the engine 11 to operate at the torque and rotation speed indicated by the engine operation point.

The rotary electrical machine control unit 33 is a functional unit performing operation control of the rotary electrical machine 12. The rotary electrical machine control unit 33 performs processing to determine a rotary electrical machine operation point and control the rotary electrical machine 12 to operate at this rotary electrical machine operation point. Here, the rotary electrical machine operation point is a control instruction value representing a control target point of the rotary electrical machine 12, and is determined by rotation speed and torque. More particularly, the rotary electrical machine operation point is an instruction value representing a control target point of the rotary electrical machine 12 determined in consideration of the required vehicle output and the engine operation point, and is determined by the rotation speed instruction value and the torque instruction value. The rotary electrical machine control unit 33 controls the rotary electrical machine 12 so as to operate at torque and at rotation speed indicated by the rotary electrical machine operation point. The rotary electrical machine control unit 33 also performs control to switch a state that the rotary electrical machine 12 generates a driving force by electric power supplied from the battery 26 and a state that the rotary electrical machine 12 generates power by the rotary driving force of the engine 11 and the like, depending on the amount of charge in the battery 26 detected by the battery state detection sensor Se5. Furthermore, the rotary electrical machine control unit 33 is structured to perform control of the rotation speed of the electric motor 25 for driving the electric pump 24.

The rotation acceleration obtaining unit 34 is a functional unit obtaining an actual rotation acceleration AI of the input shaft I. In this embodiment, the rotation acceleration obtaining unit 34 sequentially accepts input of information of the actual rotation speed of the input shaft I outputted by the input shaft rotation speed sensor Se1, and calculates a rotation speed variation per unit time, to thereby obtain the rotation acceleration (rotation speed change rate) AI. Information regarding the actual rotation acceleration AI of the input shaft I obtained by the rotation acceleration obtaining unit 34 is outputted to the release side hydraulic control unit 37 of the switch control unit 36.

The differential rotation obtaining unit 35 is a functional unit obtaining a differential rotation speed DN that is a difference in rotation speed between a target rotation speed NT of the input shaft I determined based on the actual rotation speed NO of the output shaft O and an actual rotation speed NI of the input shaft I. Here, the target rotation speed NT of the input shaft I is determined by multiplying the actual rotation speed NO of the output shaft O detected by the output shaft rotation speed sensor Se3 by the change gear ratio of one of the shift speeds in the transmission 14. The actual rotation speed NI of the input shaft I is detected by the input shaft rotation speed sensor Se1. Here, the differential rotation speed DN is obtained as the absolute value of a value resulting from subtracting the actual rotation speed NO from the target rotation speed NT of the input shaft I. Information regarding the differential rotation speed DN obtained by the differential rotation obtaining unit 35 is outputted to the release side hydraulic control unit 37 and the engagement side hydraulic control unit 38 of the switch control unit 36.

The switch control unit 36 is a functional unit performing control of switching the shift speeds of the transmission 14 by determining a shift speed in the transmission 14 based on the accelerator opening and speed of the vehicle, and controlling operation of the transmission control valve VB according to the determined shift speed. To determine such a shift speed, the switch control unit 36 refers to the shift map 42 stored in the memory 41. FIG. 3 is a chart showing an example of the shift map 42 according to this embodiment. The shift map 42 is a map in which shift schedules of the shift speeds in the transmission 14 are set based on the accelerator opening and the vehicle speed. As shown in this diagram, a plurality of upshift lines and a plurality of downshift lines are set, which are represented by straight lines generally increasing rightward (the accelerator opening increases as the vehicle speed increases). Here, the upshift lines define shift schedules from a low shift speed to a high shift speed between two adjacent shift speeds in the transmission 14, and the downshift lines define shift schedules from a high shift speed to a low shift speed. In this embodiment, since the transmission 14 has three shift speeds, there are set an upshift line from the first speed to the second speed, an upshift line from the second speed to the third speed, a downshift line from the second speed to the first speed, and a downshift line from the third speed to the second speed. Here, the upshift means switching to a shift speed having a lower change gear ratio (speed reduction ratio), and the downshift means switching to a shift speed having a higher change gear ratio (speed reduction ratio).

When the shift speed in the transmission 14 is determined, the friction engagement element corresponding to the determined shift speed is supplied with operating oil to be turned to an engaged state, and thereby the target shift speed is achieved. When the vehicle speed and the accelerator opening change to thereby cross an upshift line or a downshift line on the acceleration map of FIG. 3, the switch control unit 36 determines a new shift speed in the transmission 14 based on the accelerator opening and speed of the vehicle, and the friction engagement element corresponding to the determined shift speed is supplied with operating oil to establish an engaged state, and thereby the new shift speed is achieved. At this time, one of the friction engagement elements engaged before shifting speed is released, and one of the friction engagement elements released before shifting speed is engaged. For example, when the shift speed in the transmission 14 is switched from the second speed to the third speed to upshift, the first clutch C1 is released and the first brake B1 is engaged. In this case, when the shift speed in the transmission 14 is switched from the third speed to the second speed to downshift, the first brake B1 is released and the first clutch C1 is engaged.

Engagement and release of each of the friction engagement elements C1, B1, . . . accompanying an upshift or downshift of shift speeds are controlled by the release side hydraulic control unit 37 and the engagement side hydraulic control unit 38. The release side hydraulic control unit 37 is a functional unit controlling the oil pressure of operating oil (release side oil pressure) for the friction engagement element (release side element) on the release side. The release side hydraulic control unit 37 controls the release side oil pressure by outputting a release side control instruction signal S1 as a control signal to the transmission control valve VB and controlling operation of the plurality of control valves of the transmission control valve VB basically according to the release side control instruction signal S1. However, as will be described later, when the switch control unit 36 performs special shift control, the release side hydraulic control unit 37 controls the release side oil pressure by the release side control instruction signal S1 in only an initial stage of a shift process TP, and thereafter controls the release side oil pressure based on the actual rotation acceleration AI of the input shaft I irrelevantly to the release side control instruction signal S1. The release side control instruction signal S1 is generated by, as shown in FIG. 4, regulating a reference waveform, which is set in advance, with one or more instruction parameters 43. As such instruction parameters 43, in this embodiment, there are set a standby pressure a1, a pressure reduction start pressure a2, and a pressure reduction rate a3 individually. Thus, the release side control instruction signal S1 is generated with a waveform corresponding to the set values of the instruction parameters (a1 to a3) while based on the reference waveform set in advance.

Figure 5:
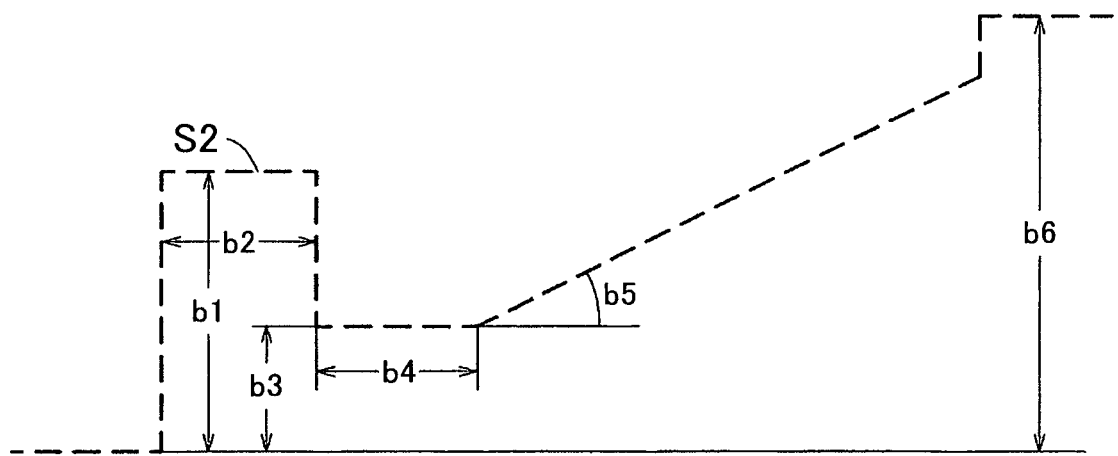
FIG. 5 is a schematic chart showing an engagement side control instruction signal according to this embodiment.

The engagement side hydraulic control unit 38 is a functional unit controlling the oil pressure of operating oil (engagement side oil pressure) for the friction engagement element (engagement side element) on the engagement side. The engagement side hydraulic control unit 38 controls the engagement side oil pressure by outputting an engagement side control instruction signal S2 as a control signal to the transmission control valve VB and controlling operation of the plurality of control valves of the transmission control valve VB according to the engagement side control instruction signal S2. The engagement side control instruction signal S2 is generated by, as shown in FIG. 5, regulating a reference waveform, which is set in advance, with one or more instruction parameters 43. As such instruction parameters 43, in this embodiment, there are set a filling pressure b1, a filling time b2, a maintained pressure b3, a maintained time b4, a pressure increase rate b5, and a full engagement pressure b6 individually. Thus, the engagement side control instruction signal S2 is generated with a waveform corresponding to the set values of the instruction parameters (b1 to b6) while based on the reference waveform set in advance. The generated release side control instruction signal S1 and the engagement side control instruction signal S2 are outputted to the transmission control valve VB to control the release side oil pressure and the engagement side oil pressure, thereby controlling engagement pressures of the friction engagement elements.

The switch control unit 36 performs shift control by switching between normal shift control and special shift control depending on whether the state of the vehicle satisfies a predetermined special shift control transition condition or not. That is, the switch control unit 36 basically performs the normal shift control, and performs the special shift control when the state of the vehicle satisfies the predetermined special shift control transition condition. Here, the special shift control transition condition is a condition related to an operation state of the rotary electrical machine 12 and a switching direction of shift speed in the transmission 14. Specifically, the special shift control transition condition is set such that the shift speed in the transmission 14 is switched from a shift speed with a higher change gear ratio to a shift speed with a lower change gear ratio (upshifted) in a state that the rotary electrical machine 12 performs regeneration by the rotary driving force transmitted from the wheels 16.

The normal shift control is performed when the special shift control transition condition is not satisfied, that is, when the rotary electrical machine 12 is powered to rotate, or rotating idly (neither powered to rotate nor performing regeneration), or when the shift speed in the transmission 14 is switched from a shift speed with a lower change gear ratio to a shift speed with a higher change gear ratio (downshifted). In the normal shift control, the release side element is quickly released and the engagement side element is engaged in the initial stage of the shift process TP. In short, the release side hydraulic control unit 37 performs control to quickly release the release side element by setting the absolute value of the pressure reduction rate a3 to a relatively large value. Further, the engagement side hydraulic control unit 38 performs control to engage the engagement side element by setting the filling pressure b1, the filling time b2, the maintained pressure b3, and the maintained time b4 appropriately, preliminary filling operating oil in the oil chamber of the engagement side element, and then increasing the engagement side oil pressure by the pressure increase rate b5 corresponding to the magnitude of the torque transmitted from the wheels 16.

Figure 6:
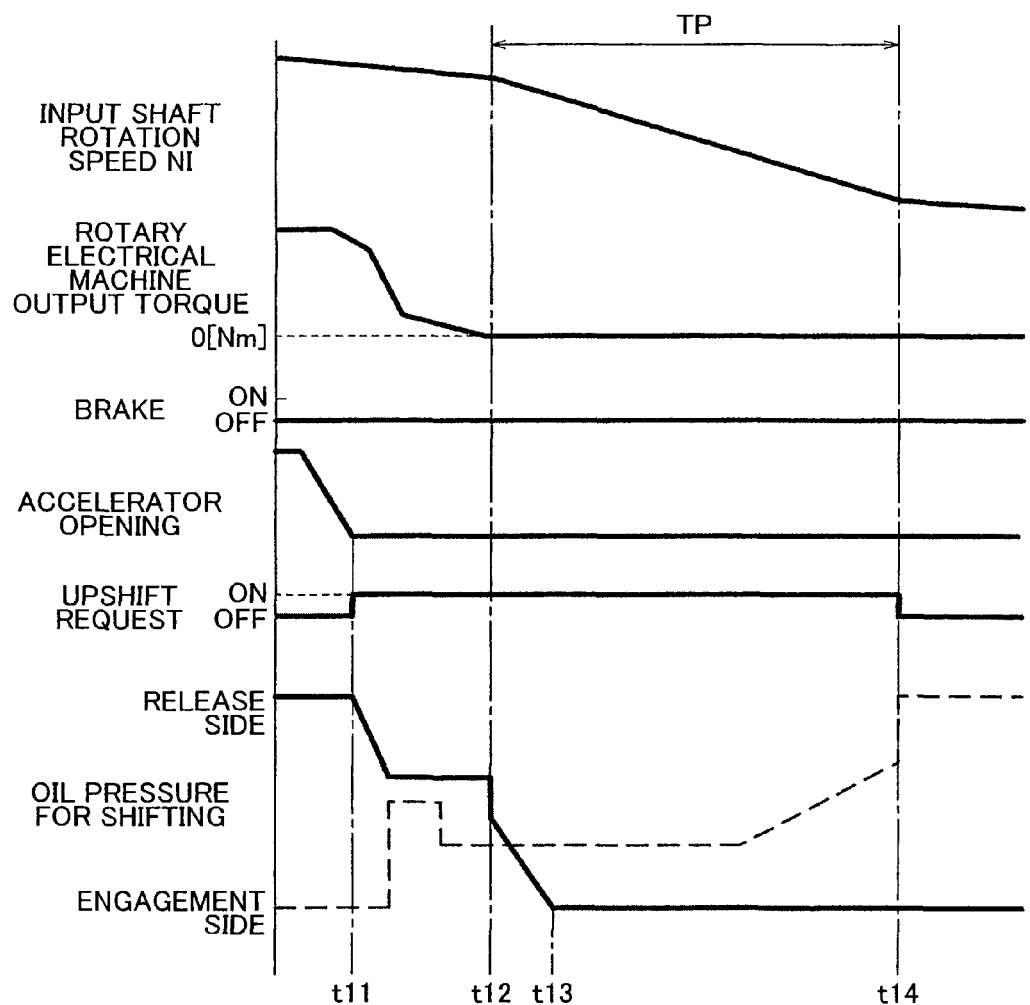
FIG. 6 is a timing chart for describing normal shift control processing according to this embodiment.

FIG. 6 is a timing chart when a shift operation is performed by the normal shift control. In FIG. 6, from the top in order, there are shown rotation speed NI of the input shaft I, torque outputted by the rotary electrical machine 12, brake operation by the driver, accelerator opening, upshift request, release side oil pressure and engagement side oil pressure. When the accelerator opening becomes zero at time t11, the output torque of the rotary electrical machine 12 decreases gradually and turns to zero at time t12. Note that the upshift request is on at the time t11. From time t11 to t12, the release side oil pressure is maintained at a retained pressure corresponding to the output torque, and the engagement side oil pressure is maintained at a predetermined maintained pressure after the preliminary filling is completed. In this example, the brake operation by the driver is not performed, and the rotary electrical machine 12 is not outputting negative torque. Thus, the normal shift control is performed. Specifically, from time t12 to t13, the release side oil pressure is decreased rapidly, and the engagement side element is released quickly in the initial stage of the shift process TP. Thereafter, the engagement side oil pressure is increased gradually to engage the engagement side element, and the shift process TP finishes at time T14.

On the other hand, when the special shift control transition condition is satisfied, the special shift control particular to the present invention is performed. This special shift control is to retain the release side element in a slip state across the entire shift process TP. In this embodiment, it is performed through control steps of standby control, change rate control, rotation speed control, release control, and engagement control. The standby control, change rate control, rotation speed control, and release control are performed by the release side hydraulic control unit 37 to control the release side oil pressure, and the engagement control is performed by the engagement side hydraulic control unit 38 to control the engagement side oil pressure.

Figure 7:
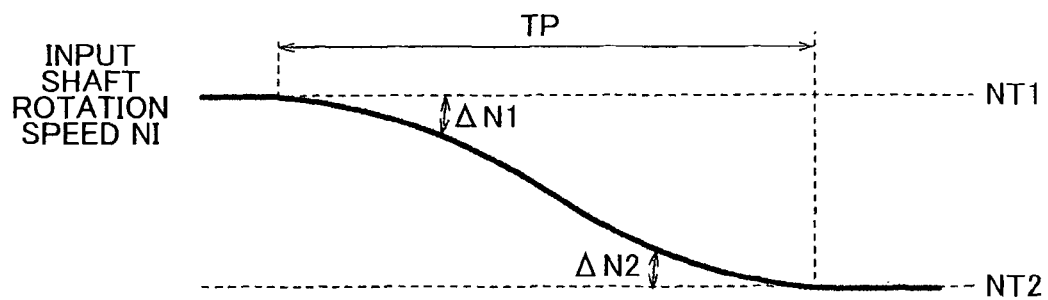
FIG. 7 is an explanatory chart for describing a shift process according to this embodiment.

Here, the shift process TP (see FIG. 7) is a process in which the rotation speed of the input shaft I shifts from a pre-switching target rotation speed NT1 as a target rotation speed NT before switching shift speeds to a post-switching target rotation speed NT2 as a target rotation speed NT after switching shift speeds. In this example, the shift process TP is set to a period from a time when a differential rotation speed DN1 before switching shift speeds obtained by the differential rotation obtaining unit 35 becomes equal to or higher than a predetermined value to a time when a differential rotation speed DN2 after switching shift speeds obtained by the differential rotation obtaining unit 35 becomes equal to or lower than a predetermined value (in other words, a period from a time when the release side element starts a slip to a time when an input element of the engagement side element synchronizes with an output element of the engagement side element). The predetermined values in this case are set to values that enable to identify that a deviation has occurred between the actual rotation speed of the input shaft I and the target rotation speeds NT1, NT2 before and after switching shift speeds.

In the special shift control, the standby control is first performed before entering the shift process TP. In this standby control, when an upshift of shift speed is requested based on the accelerator opening and speed of the vehicle, the release side hydraulic control unit 37 sets the release side oil pressure to a retained pressure corresponding to output torque until a certain time elapses. Here, this standby time is monitored by an internal timer.

When a certain time elapses after the upshift is requested, change rate control is performed next. This change rate control is performed in the initial stage of the shift process TP, where the release side hydraulic control unit 37 reduces the release side oil pressure by the pressure reduction rate a3 corresponding to the magnitude of the negative torque (regeneration torque) outputted by the rotary electrical machine 12. In this example, as the regeneration torque becomes larger, the absolute value of the pressure reduction rate a3 is set smaller, and as the regeneration torque becomes smaller, the absolute value of the pressure reduction rate a3 is set larger. However, in either case, the absolute value of the pressure reduction rate a3 at this moment is set to a sufficiently smaller value than the absolute value of the pressure reduction rate a3 in the above-described normal shift control, and the release side oil pressure is reduced gently. In the meantime, the release side element is neither engaged nor released fully and is retained in a slip state.

During the change rate control, the release side hydraulic control unit 37 controls the release side oil pressure so that the engagement pressure of the release side element becomes a certain magnitude or larger. In this embodiment, a lower limit value is set to the release side oil pressure during the change rate control so that the engagement pressure of the release side element becomes a certain magnitude or larger. Accordingly, the release side oil pressure during the change rate control is kept equal to or higher than an oil pressure limit PL. The oil pressure limit PL at this time is set to a value such that the engagement pressure of the release side element becomes at least larger than zero. Specifically, it is preferred that the release side oil pressure in a state that a friction plate included in the release side element reaches the stroke end on the release side (stroke end pressure) be set as the oil pressure limit PL. Note that considering variations during manufacturing, deteriorations over time, and the like, a pressure resulting from adding a predetermined value to the stroke end pressure may be set as the oil pressure limit PL.

The release side hydraulic control unit 37 monitors the degree of advancement a of a shift operation while the change rate control is performed. The degree of advancement a is an indicator representing how far the switching of shift speeds has advanced. In this example, the degree of advancement a is derived as a ratio of a difference in rotation speed between the pre-switching target rotation speed NT1 of the input shaft I and the actual rotation speed NI of the input shaft I during the shift operation, to a difference in rotation speed between the pre-switching target rotation speed NT1 of the input shaft I and the post-switching target rotation speed NT2 of the input shaft I (rotation speed change width W). The target rotation speeds NT1, NT2 of the input shaft I before and after switching shift speeds are each derived by multiplying the actual rotation speed NO of the output shaft O detected by the output shaft rotation speed sensor Se3 by the change gear ratio of one of the shift speeds in the transmission 14, as described above. The actual rotation speed NI of the input shaft I is detected by the input shaft rotation speed sensor Se1. Therefore, the degree of advancement a is derived based on the actual rotation speed NI of the input shaft I detected by the input shaft rotation speed sensor Se1, the actual rotation speed NO of the output shaft O detected by the output shaft rotation speed sensor Se3, and respective change gear ratios of the shift speeds before and after switching.

Using a time point when the degree of advancement a reaches a predetermined percentage as a switch point, the change rate control is performed until this switch point as long as the rotary electrical machine 12 is performing regeneration. In this embodiment, under the condition that the rotary electrical machine 12 is performing regeneration, a time when the shift operation has advanced 50% (the degree of advancement a has reached 0.5) is taken as a switch point, and the change rate control is performed until this switch point. Here, in this example, it is structured to determine whether the rotary electrical machine 12 is performing regeneration or not based on the accelerator opening and the magnitude of torque outputted by the rotary electrical machine 12. Specifically, when the accelerator opening is equal to or lower than a predetermined value and the rotary electrical machine 12 is outputting torque smaller than a predetermined value, it is determined that the rotary electrical machine 12 is performing regeneration, and otherwise it is determined that the rotary electrical machine 12 is not performing regeneration.

Under the condition that the rotary electrical machine 12 is performing regeneration, when the shift operation has advanced 50% (the degree of advancement a has reached 0.5) and reached the switch point, the rotation speed control is performed next. In this rotation speed control, the release side hydraulic control unit 37 changes the release side oil pressure so as to make the rotation speed NI of the input shaft I become the target rotation speed NT at every time point of the shift process TP. In this embodiment, a target shift time representing a target time required for switching shift speeds is set in advance, and it is assumed that the shift operation is completed when the target shift time has elapsed after the start of the shift operation. Note that the target shift time is stored in the memory 41 as target shift time data 44. The target rotation speed NT of the input shaft I at every time point is determined based on the target shift time and the rotation speed change width W as a difference in rotation speed of the input shaft I before and after switching shift speeds. At this time, the target rotation speed NT at every time point of the shift process TP is set to draw a trace over time which causes substantially no behavior change in the vehicle when switching of shift speeds is performed. In this example, the target rotation speed NT at every time point is set so that the rotation speed of the input shaft I from a time point when the rotation speed control is started until a time point when the shift operation is completed draws a trace over time represented by a quadric curve.

Figure 8:
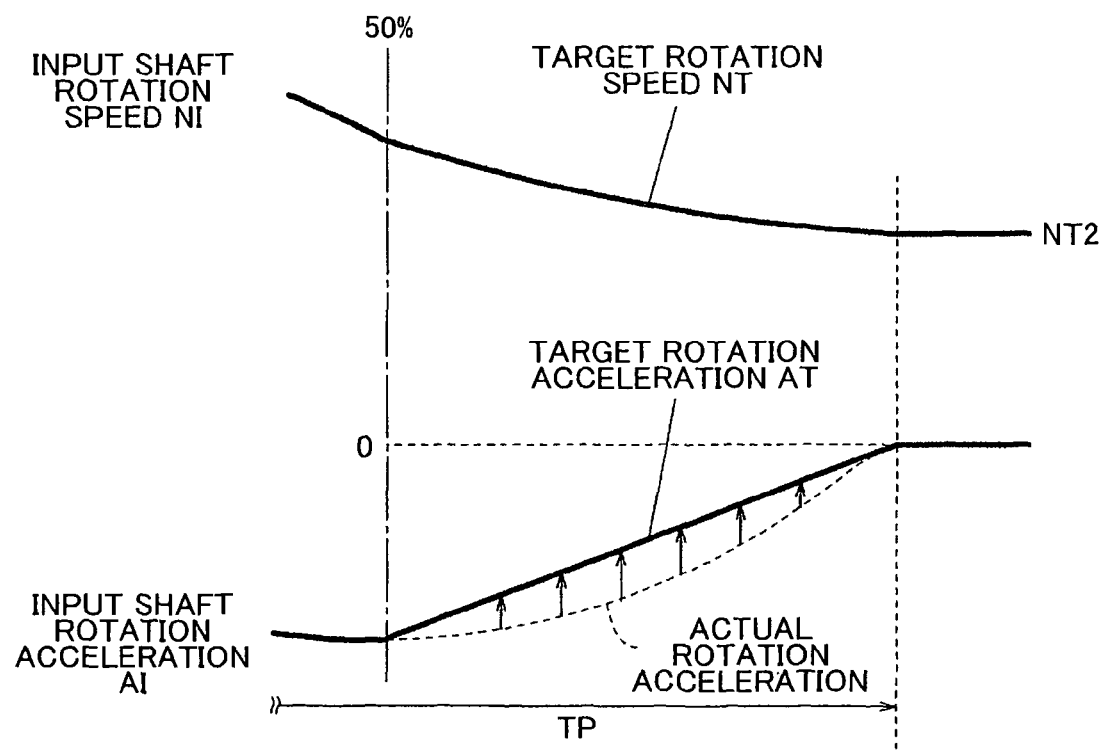
FIG. 8 is an explanatory chart for describing a control method of a release side oil pressure in rotation speed control.

In this embodiment, a target rotation acceleration AT (target rotation speed change rate) at every time point is further derived from the target rotation speed NT at every time point set as described above. In this example, since the target rotation speed NT at every time point is set to draw a trace over time represented by a quadric curve, the target rotation acceleration AT at every time point is set so that the absolute value thereof decreases linearly gradually toward the end point of the shift operation, and finally becomes zero. Note that it may be structured to set the target rotation acceleration AT at every time point considering the acceleration of the vehicle in addition. The release side hydraulic control unit 37 then changes the release side oil pressure so that the actual rotation acceleration AI of the input shaft I obtained by the rotation acceleration obtaining unit 34 follows the target rotation acceleration AT at every time point. That is, as shown in FIG. 8, the release side hydraulic control unit 37 compares the target rotation acceleration AT of the input shaft I at every time point with the actual rotation acceleration AI and, when a deviation is generated therebetween, changes the release side oil pressure so that the actual rotation acceleration AI of the input shaft I changes in a direction to counteract this deviation. In this manner, the rotation speed NI of the input shaft I can be shifted to the post-switching target rotation speed NT2 smoothly in a latter half stage of the shift process TP. In the meantime, the release side element is neither engaged nor released fully and is maintained in a slip state.

The rotation speed control is performed as long as the rotary electrical machine 12 performs regeneration, until the differential rotation speed DN2 between the post-switching target rotation speed NT2 obtained by the differential rotation obtaining unit 35 and the actual rotation speed NI of the input shaft I becomes equal to or lower than a predetermined value. In this example, the predetermined value at this time is set to a value equal to the reference value for determining completion of the shift process TP. Therefore, the timing when the rotation speed control is finished and the timing when the shift process TP is finished are the same in this example.

When the rotary electrical machine 12 stops regeneration while the change rate control or the rotation speed control is performed, or when the differential rotation speed DN2 after switching shift speeds obtained by the differential rotation obtaining unit 35 becomes equal to or lower than a predetermined value, the release control is then performed. In this release control, the release side hydraulic control unit 37 reduces the release side oil pressure by the pressure reduction rate equal to the pressure reduction rate of the release side oil pressure in the normal shift control, and turns the release side oil pressure to zero quickly. Thus, the release side element is fully released quickly.

In the engagement control, the engagement side hydraulic control unit 38 controls the engagement side oil pressure so as to maintain a state that the engagement side element is fully released until the shift process TP is finished (or the rotation speed control is finished), and to engage the engagement side element after the shift process TP is finished. In this embodiment, until the shift process TP is finished, the engagement side hydraulic control unit 38 maintains, across the entire shift process TP, the engagement side oil pressure at a pressure such that increasing the engagement side oil pressure by a predetermined amount enables to engage the release side element quickly, and increases the engagement side oil pressure to the full engagement pressure after the shift process TP is finished.

Figure 9:
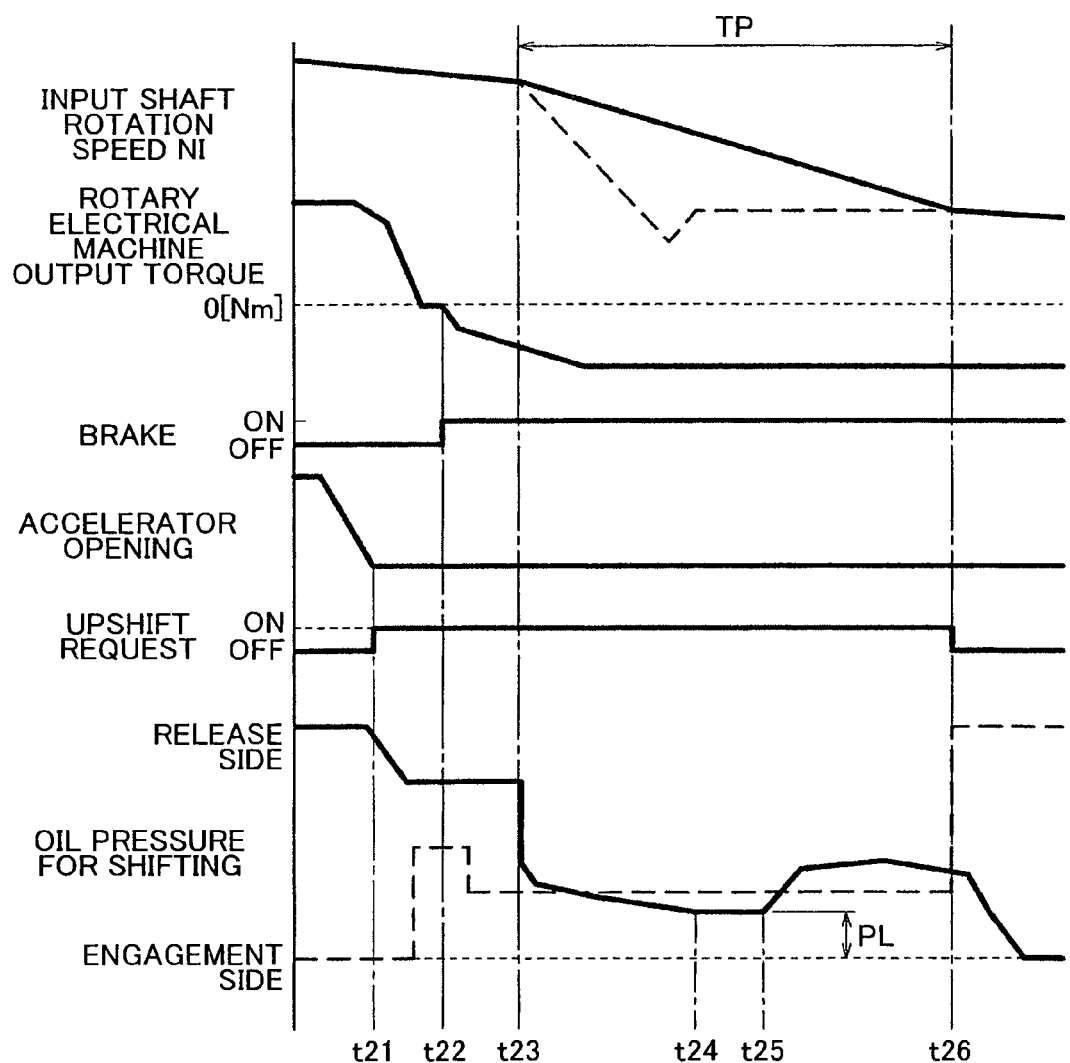
FIG. 9 is a timing chart for describing special shift control processing according to this embodiment.

FIG. 9 is a timing chart when a shift operation is performed by the special shift control. FIG. 9 shows, from the top in order similarly to FIG. 6, the rotation speed NI of the input shaft I, torque outputted by the rotary electrical machine 12, brake operation by the driver, accelerator opening, upshift request, release side oil pressure and engagement side oil pressure. When the accelerator opening becomes zero at time t21, the output torque of the rotary electrical machine 12 decreases gradually. The upshift request is turned on at time t21. From time t21 to t23, the release side oil pressure is at a retained pressure corresponding to the output torque, and the engagement side oil pressure is maintained at a predetermined maintained pressure after the preliminary filling is completed. During this period, the driver performs a brake operation at time t22, and thereafter the rotary electrical machine 12 turns to a state that the rotary electrical machine 12 outputs negative torque for braking the vehicle and performs regeneration. In this case, an upshift request is made in a state that the rotary electrical machine 12 is performing regeneration, and thus the special shift control is performed. Specifically, from time t23 to time t26, the release side oil pressure is controlled so that the release side element is maintained in a slip state across the entire shift process TP.

More specifically, the change rate control is performed from time t23 to time t25, and the release side oil pressure is decreased gradually by the pressure reduction rate corresponding to the magnitude of the negative torque (regeneration torque) outputted by the rotary electrical machine 12. However, at time t24, the release side oil pressure reaches the oil pressure limit PL as a set lower limit value of the release side oil pressure and thus is not reduced any further, and the release side oil pressure is maintained at the oil pressure limit PL from time t24 to time t25. Then, at a time point when the shift operation has advanced 50%, namely, a switch point at time t25, the control is switched from the change rate control to the rotation speed control. In the rotation speed control, the release side oil pressure is changed so that the actual rotation acceleration AI of the input shaft I follows the target rotation acceleration AT at every time point. In the shown example, from time t25 to time t26, the release side oil pressure increases once and maintains a substantially constant pressure thereafter. Subsequently, when the differential rotation speed DN2 becomes equal to or smaller than a predetermined value at time t26, the engagement side oil pressure is increased to the full engagement pressure, and thereafter the release side oil pressure is turned to zero quickly.

In the special shift control as described above, across the entire shift process TP, a state that the engagement side element is fully released is maintained, and the release side element is neither engaged nor released fully and is maintained in a slip state. Therefore, by the special shift control according to the present invention, the switch control unit 36 controls the rotation speed NI of the input shaft I during the shift operation substantially only by controlling the release side oil pressure. Then by keeping the release side element in a slip state across the entire shift process TP, there is maintained a state that part of the rotary driving force transmitted from the wheels 16 is transmitted to the input shaft I side via the release side element across the entire shift process TP. Accordingly, even when the rotary electrical machine 12 is made to output relatively large negative torque for performing regeneration, the large negative torque outputted by the rotary electrical machine 12 is compensated partially by the rotary driving force transmitted from the wheels 16, thereby suppressing a rapid change of the rotation speed of the input shaft I. FIG. 9 shows how the rotation speed NI of the input shaft I changes gently across the entire shift process TP. Thus, generation of shift shock can be suppressed. Further, since the generation of shift shock can be suppressed just by controlling the release side oil pressure, it is not necessary to limit the magnitude of the negative torque (regeneration torque) outputted by the rotary electrical machine 12, which is different from the case where the release side element is fully released relatively quickly in the initial stage of the shift process TP. Therefore, a problem such as decrease of energy to be regenerated does not occur, and high energy efficiency can be maintained.

Note that in FIG. 9, for comparison, a dashed line shows how the rotation speed NI of the input shaft I changes when the release side element is released quickly similarly to the normal shift control, also when the rotary electrical machine 12 is outputting negative torque to perform regeneration. In this example, as is apparent from the drawing, the rotation speed NI of the input shaft I decreases rapidly and drops below the post-switching target rotation speed NT2 in the initial stage of the shift process TP. When the rotation speed NI of the input shaft I changes rapidly in this manner, generation of shift shock is highly possible. On the other hand, when the special shift control is performed, the rotation speed M of the input shaft I changes gently across the entire shift process TP as described above, thereby suppressing generation of shift shock effectively.

Here, in the change rate control, the release side oil pressure is decreased by the pressure reduction rate a3 corresponding to the magnitude of regeneration torque outputted by the rotary electrical machine 12. In this example, the release side oil pressure is reduced by the pressure reduction rate a3 with an absolute value that becomes smaller as the regeneration torque becomes larger, and the release side oil pressure is reduced by the pressure reduction rate a3 with an absolute value that becomes larger as the regeneration torque becomes smaller. In the structure of this example, as the regeneration torque becomes larger, the release side oil pressure is reduced more gently, and the rotary driving force transmitted from the wheels 16 to the input shaft I side via the release side element becomes larger, by which large negative torque of the rotary electrical machine 12 can be compensated appropriately. Thus, relatively simple processing allows to appropriately suppress a rapid change of the rotation speed of the input shaft I.

Furthermore, in the rotation speed control, the target rotation speed NT and target rotation acceleration AT of the input shaft I at every time point are determined based on the target shift time and the rotation speed change width W, and the release side oil pressure is changed so that the actual rotation acceleration AI of the input shaft I follows the target rotation acceleration AT at every time point, whereby the actual rotation acceleration AI (time change rate of the rotation speed) of the input shaft I, which is highly related to generation of shift shock, can be controlled appropriately. Therefore, a rapid change of rotation speed of the input shaft I can be suppressed more securely, and generation of shift shock can be suppressed more reliably. Moreover, in this example, the target rotation speed NT at every time point is set so that the rotation speed of the input shaft I from a time point when the rotation speed control is started until a time point when the shift operation is completed draws a trace over time represented by a quadric curve. In this case, the absolute value of the target rotation acceleration AT at every time point decreases gradually toward an end point of the shift operation (and finally becomes zero). Thus, the rotation speed NI of the input shaft I can be shifted to the post-switching target rotation speed NT2 smoothly in a latter half stage of the shift process TP. Accordingly, generation of shift shock can be suppressed more reliably.

4. Procedure of Control Processing

Figure 10:
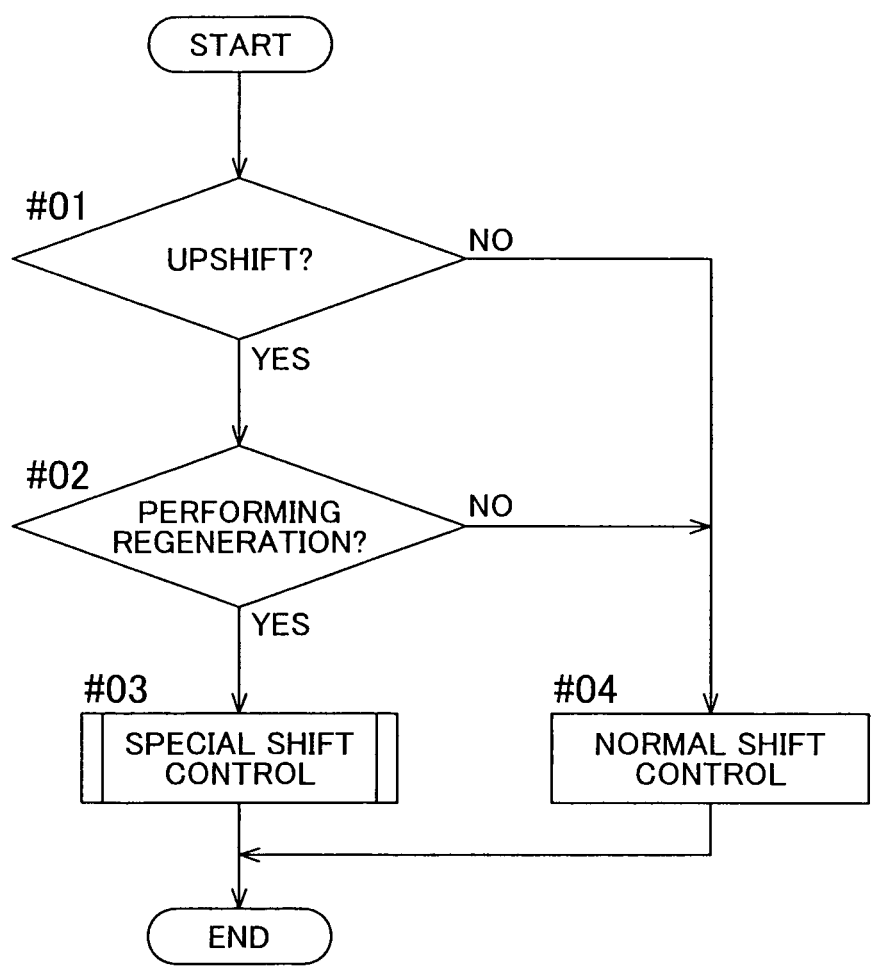
FIG. 10 is a flowchart showing an overall processing procedure of shift control processing according to this embodiment.
Figure 11:
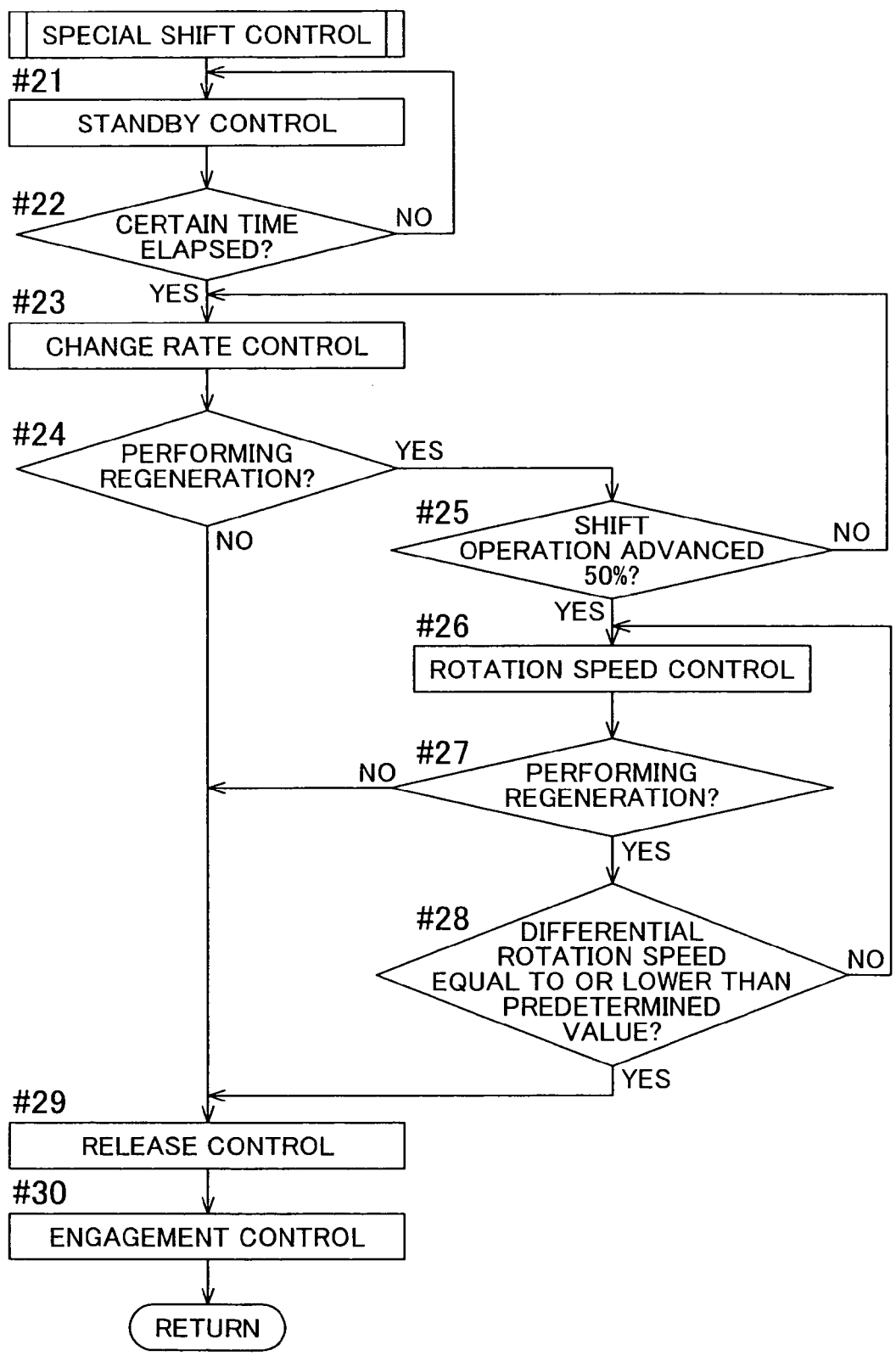
FIG. 11 is a flowchart showing a processing procedure of the special shift control processing according to this embodiment.

Next, the contents of control of the vehicle drive apparatus 1 according to this embodiment will be described. FIG. 10 is a flowchart showing an overall processing procedure of shift control processing of the vehicle drive apparatus 1 according to this embodiment. FIG. 11 is a flowchart showing a processing procedure of special shift control processing of step #03 in FIG. 10. The procedures of control processing of the vehicle drive apparatus 1 described below are performed by the functional units 32 to 38 of the control unit 31. When the functional units 32 to 38 of the control unit 31 are formed by a program, the arithmetic processing unit included in the control unit 31 operates as a computer to execute the program forming the functional units 32 to 38.

4-1. Overall Procedure of Shift Control Processing

In the shift control processing according to this embodiment, first, it is determined whether an upshift request of shift speed is made or not based on the accelerator opening and speed of the vehicle (step #01), and it is determined whether the rotary electrical machine 12 is performing regeneration or not based on the accelerator opening and the magnitude of torque outputted by the rotary electrical machine 12 (step #02). Note that the order of performing the determination steps above is not specifically determined. When it is determined that an upshift request of shift speed is made (step #01: Yes) and it is determined that the rotary electrical machine 12 is performing regeneration (step #02: Yes), the switch control unit 36 performs the special shift control (step #03). A detailed processing procedure of the special shift control will be described below. On the other hand, when it is determined that no upshift request of shift speed is made (step #01: No), or it is determined that the rotary electrical machine 12 is not performing regeneration (step #02: No), the switch control unit 36 performs the normal shift control (step #04). Then, while the vehicle is traveling, the processing from steps #01 to #04 is performed sequentially repeatedly.

4-2. Overall Procedure of Special Shift Control Processing

Next, a detailed operation procedure of the special shift control processing of step #03 will be described. In the special shift control, first the standby control is performed (step #21). In the standby control, the release side oil pressure is maintained at a retained pressure corresponding to output torque until a certain time elapses. When it is determined with an internal timer that the certain time elapsed (step #22: Yes), then the change rate control is performed (step #23). Since the contents of this change rate control are already described, a detailed description thereof is omitted here. While the change rate control is performed, it is determined whether the rotary electrical machine 12 is performing regeneration or not based on the accelerator opening and the magnitude of torque outputted by the rotary electrical machine 12 (step #24). When it is determined that the rotary electrical machine 12 is not performing regeneration (step #24: No), the release control is performed (step #29). In the release control, the release side oil pressure is reduced rapidly, and the release side element is fully released quickly. On the other hand, when it is determined that the rotary electrical machine 12 is performing regeneration (step #24: Yes), then it is determined whether the shift operation has advanced 50% and reached the switch point or not (step #25). When the degree of advancement of the shift operation has not reached 50% (step #25: No), the processing from step #23 to step #25 is performed repeatedly. When the degree of advancement of the shift operation has reached 50% (step #25: Yes), then the rotation speed control is performed (step #26). Since the contents of this rotation speed control are already described, a detailed description thereof is omitted here.

While the rotation speed control is performed, it is determined whether the rotary electrical machine 12 is performing regeneration or not based on the accelerator opening and the magnitude of torque outputted by the rotary electrical machine 12 (step #27). When it is determined that the rotary electrical machine 12 is not performing regeneration (step #27: No), the release control is performed (step #29), and the release side element is fully released quickly. On the other hand, when it is determined that the rotary electrical machine 12 is performing regeneration (step #27: Yes), then it is determined whether or not the differential rotation speed DN2 is equal to or lower than a predetermined value (step #28). When the differential rotation speed DN2 is higher than the predetermined value (step #28: No), the processing of step #26 to step #28 is performed repeatedly. When the differential rotation speed DN2 becomes equal to or lower than the predetermined value (step #28: Yes), then the release control is performed (step #29), and the release side element is fully released quickly. Further, the engagement control is performed (step #30). In this engagement control, the engagement side oil pressure is increased to the full engagement pressure after the shift process TP is finished. Thus, the special shift control processing is finished.

[Other Embodiments]

(1) In the above-described embodiment, there is described an example in which the change rate control is performed in the initial stage of the shift process TP, and the rotation speed control is performed thereafter. However, the embodiment of the present invention is not limited thereto. Specifically, one of preferred embodiments of the present invention is structured to perform only the change rate control across the entire shift process TP as long as the release side element is maintained in a slip state across the entire shift process TP. In this structure, it is possible to achieve both suppression of generation of shift shock and improvement in energy efficiency with relatively simple control contents.

(2) Alternatively, one of preferred embodiments of the present invention is structured to perform only the rotation speed control across the entire shift process TP. In this structure, at every time point of the shift process TP, the rotation acceleration AI and the rotation speed NI of the input shaft I are controlled precisely and meanwhile changed appropriately, whereby it is possible to achieve both suppression of generation of shift shock and improvement in energy efficiency.

(3) In the above-described embodiment, there is described an example in which the change rate control is performed in the initial stage of the shift process TP, and the change rate control is shifted to the rotation speed control when the shift operation has advanced 50% (the degree of advancement a becomes 0.5) and reached the switch point. However, the embodiment of the present invention is not limited thereto. Specifically, the switch point defining the timing to shift from the change rate control to the rotation speed control may be set arbitrary. When the switch point is set based on the rotation speed NI of the input shaft I as in this example, the set value may be changed appropriately between 0% ($a=0$) to 100% ($a=1$). Note that the case of 0% ($a=0$) corresponds to the above-described structure of performing only the rotation speed control across the entire shift process TP, and the case of 100% ($a=1$) corresponds to the above-described structure of performing only the change rate control across the entire shift process TP. Further, when the switch point is set, another preferred structure is to set the switch point based on an elapsed time since the change rate control is started, oil pressure level of the release side oil pressure, and/or the like. For example, a switch point may be set to a time point when a predetermined time elapsed since the change rate control is started, a time point when the level of the release side oil pressure reaches a predetermined pressure, or the like, and the rotation speed control may be performed irrespective of the degree of advancement a at the switch point and thereafter.

(4) In the above-described embodiment, there is described an example in which, in the rotation speed control, the release side oil pressure is changed so that the actual rotation acceleration AI of the input shaft I obtained by the rotation acceleration obtaining unit 34 follows the target rotation acceleration AT at every time point. However, the embodiment of the present invention is not limited thereto. Specifically, one of preferred embodiments of the present invention may be structured to change, for example with reference to the rotation speed instead of the rotation acceleration, the release side oil pressure so that the actual rotation speed NI of the input shaft I detected by the input shaft rotation speed sensor Se1 follows the target rotation speed NT at every time point.

(5) In the above-described embodiment, there is described an example in which, in the rotation speed control, the target rotation speed NT at every time point is set to draw a trace over time represented by a quadric curve. However, the embodiment of the present invention is not limited thereto. Specifically, one of preferred embodiments of the present invention may be structured such that the target rotation speed NT is set to draw a trace over time represented by a linear curve, a cubic or higher order curve, a hyperbola, or the like, as long as the target rotation acceleration AT at every time point draws a trace over time so that the absolute value thereof decreases gradually toward the end point of the shift operation.

(6) In the above-described embodiment, there is described an example in which the transmission 14 includes three shift speeds (first speed, second speed, and third speed) with different change gear ratios. However, the embodiment of the present invention is not limited thereto. Specifically, as long as the transmission 14 is a multi-speed transmission, the number of shift speeds is not particularly limited. One of preferred embodiments of the present invention may be structured having two shift speeds or four or more shift speeds.

(7) In the above-described embodiment, there is described an example in which the vehicle drive apparatus 1 has a uniaxial structure in which all of the input shaft I, the intermediate shaft M, and the output shaft O are arranged coaxially. However, the embodiments of the present invention are not limited thereto. Specifically, for example, in one of preferred embodiments of the present invention, the present invention may be applied to a vehicle drive apparatus 1 having a structure in which the input shaft I, the intermediate shaft M, and the output shaft O are arranged on different shafts.

The present invention can be used preferably for a control device for controlling a vehicle drive apparatus including an input member drive-coupled to an engine and a rotary electrical machine, an output member, and a transmission having a plurality of friction engagement elements, in which a plurality of shift speeds are switched by controlling engagement and release of the plurality of friction engagement elements, and a rotary driving force of the input member is shifted by a change gear ratio of one of the shift speeds and outputted to the output member.

What is claimed is:

1. A vehicle control device for controlling a vehicle drive apparatus, comprising:
   an input member drive-coupled to an engine and a rotary electrical machine;
   an output member; and
   a transmission having a plurality of friction engagement elements, in which a plurality of shift speeds are switched by controlling engagement and release of the plurality of friction engagement elements, and a rotary driving force of the input member is shifted by a change gear ratio of one of the shift speeds and outputted to the output member, wherein
   when an upshift that switches to the shift speed having a smaller change gear ratio is performed in the transmission in a state that the rotary electrical machine is performing regeneration, a release side oil pressure as an oil pressure of operating oil for a release side element, which is the friction engagement element that is released when the upshift is performed, is controlled so as to maintain the release side element in a slip state across an entire shift process.

2. The vehicle control device according to claim 1, wherein change rate control is performed to decrease the release side oil pressure by a pressure reduction rate corresponding to a magnitude of regeneration torque outputted by the rotary electrical machine.

3. The vehicle control device according to claim 1, wherein rotation speed control is performed to change the release side oil pressure so that a rotation speed of the input member becomes a target rotation speed at every time point of the shift process.

4. The vehicle control device according to claim 1, wherein
in an initial stage of the shift process, change rate control is performed to decrease the release side oil pressure by a pressure reduction rate corresponding to a magnitude of regeneration torque outputted by the rotary electrical machine, and
at a predetermined switch point or later after the change rate control is performed, rotation speed control is performed to change the release side oil pressure so that a rotation speed of the input member becomes a target rotation speed at every time point after the change rate control.

5. The vehicle control device according to claim 3, wherein
in the rotation speed control, a target rotation speed at every time point of the shift process is set to draw a trace over time which causes substantially no behavior change in the vehicle when switching of the shift speeds is performed.

6. The vehicle control device according to claim 3, wherein
in the rotation speed control,
a target rotation speed change rate of the input member at every time point is determined based on a target shift time set in advance representing a target time required for switching shift speeds and a rotation speed change width representing a difference in rotation speed of the input member before and after switching shift speeds, and
control is performed to change the release side oil pressure so that an actual rotation speed change rate of the input member follows a target rotation speed change rate at every time point.

7. The vehicle control device according to claim 4, wherein
in the change rate control, a lower limit value of the release side oil pressure is set so that an engagement pressure of the release side element becomes equal to or higher than a certain pressure.

8. The vehicle control device according to claim 1, wherein
until the shift process is finished, an engagement side oil pressure as an oil pressure of operating oil for an engagement side element representing the friction engagement element on an engagement side is maintained at a pressure which places the engagement side element in a released state across an entire range of the shift process, and
after the shift process is finished, the release side oil pressure is turned to zero, and the engagement side oil pressure is increased to a full engagement pressure.

9. The vehicle control device according to claim 1, wherein
a target rotation speed of the input member before and after switching the shift speeds is derived based on a rotation speed and a change gear ratio of the output member, and
the shift process is a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

10. The vehicle control device according to claim 4, wherein
in the rotation speed control, a target rotation speed at every time point of the shift process is set to draw a trace over time which causes substantially no behavior change in the vehicle when switching of the shift speeds is performed.

11. The vehicle control device according to claim 4, wherein
in the rotation speed control,
a target rotation speed change rate of the input member at every time point is determined based on a target shift time set in advance representing a target time required for switching shift speeds and a rotation speed change width representing a difference in rotation speed of the input member before and after switching shift speeds, and
control is performed to change the release side oil pressure so that an actual rotation speed change rate of the input member follows a target rotation speed change rate at every time point.

12. The vehicle control device according to claim 5, wherein
in the rotation speed control,
a target rotation speed change rate of the input member at every time point is determined based on a target shift time set in advance representing a target time required for switching shift speeds and a rotation speed change width representing a difference in rotation speed of the input member before and after switching shift speeds, and
control is performed to change the release side oil pressure so that an actual rotation speed change rate of the input member follows a target rotation speed change rate at every time point.

13. The vehicle control device according to claim 2, wherein
until the shift process is finished, an engagement side oil pressure as an oil pressure of operating oil for an engagement side element representing the friction engagement element on an engagement side is maintained at a pressure which places the engagement side element in a released state across an entire range of the shift process, and
after the shift process is finished, the release side oil pressure is turned to zero, and the engagement side oil pressure is increased to a full engagement pressure.

14. The vehicle control device according to claim 13, wherein
a target rotation speed of the input member before and after switching the shift speeds is derived based on a rotation speed and a change gear ratio of the output member, and
the shift process is a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

15. The vehicle control device according to claim 3, wherein
until the shift process is finished, an engagement side oil pressure as an oil pressure of operating oil for an engagement side element representing the friction engagement element on an engagement side is maintained at a pressure which places the engagement side element in a released state across an entire range of the shift process, and
after the shift process is finished, the release side oil pressure is turned to zero, and the engagement side oil pressure is increased to a full engagement pressure.

16. The vehicle control device according to claim 15, wherein
the target rotation speed of the input member before and after switching the shift speeds is derived based on a rotation speed and a change gear ratio of the output member, and
the shift process is a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

17. The vehicle control device according to claim 4, wherein
until the shift process is finished, an engagement side oil pressure as an oil pressure of operating oil for an engagement side element representing the friction engagement element on an engagement side is maintained at a pressure which places the engagement side element in a released state across an entire range of the shift process, and
after the shift process is finished, the release side oil pressure is turned to zero, and the engagement side oil pressure is increased to a full engagement pressure.

18. The vehicle control device according to claim 17, wherein
the target rotation speed of the input member before and after switching the shift speeds is derived based on a rotation speed and a change gear ratio of the output member, and
the shift process is a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

19. The vehicle control device according to claim 2, wherein
a target rotation speed of the input member before and after switching the shift speeds is derived based on a rotation speed and a change gear ratio of the output member, and
the shift process is a process of shifting speed from a time point when a rotation speed difference between an actual rotation speed of the input member and the target rotation speed of the input member before switching the shift speeds becomes equal to or larger than a predetermined value, to a time point when the rotation speed difference between the actual rotation speed of the input member and the target rotation speed of the input member after switching the shift speeds becomes equal to or smaller than a predetermined value.

* * * * *